Jan. 30, 1968 A. T. BOTKA 3,365,794

SEMICONDUCTING DEVICE

Filed May 15, 1964 4 Sheets-Sheet 1

INVENTOR:
ALEXANDER T. BOTKA

BY,
Wolf, Greenfield & Hieken
ATTORNEYS

INVENTOR:
ALEXANDER T. BOTKA
BY Wolf Greenfield & Hieken
ATTORNEYS

INVENTOR:
ALEXANDER T. BOTKA
BY,
Wolf, Greenfield & Hieken
ATTORNEYS

*INVENTOR:*
ALEXANDER T. BOTKA
*BY,*
*Wolf Greenfield + Hieken*
*ATTORNEYS*

3,365,794
Patented Jan. 30, 1968

3,365,794

SEMICONDUCTING DEVICE

Alexander T. Botka, Reading, Mass., assignor to Transitron Electronics Corporation, Wakefield, Mass., a corporation of Delaware Filed May 15, 1964, Ser. No. 367,676
5 Claims. (Cl. 29—580)

The present invention relates to a means and method of fabricating an integrated semiconductor assembly having a plurality of rectifying junctions in a series.

Devices made in accordance with the present invention have unique and unusually high reverse voltage breakdown characteristics. Consequently, the present invention is particularly useful in the fabrication of medium and high power devices and devices having high reverse voltage breakdown characteristics. In a preferred form, the present invention is useful in the fabrication of rectifier or diode assemblies consisting of a series of rectifiers or diodes which are integrally formed and uniformly matched. on embodiment of this invention is particularly adapted for fabrication of an integral series of rectifying junctions for use in high power relatively low voltage circuits. A second embodiment of this invention is particularly useful in the fabrication of integral devices having a series of rectifying junctions useful in low current relatively high voltage circuits. This invention is also useful in fabricating integrated circuit devices.

It is an object of this invention to provide a method of fabricating a series of integral rectifying junctions arranged as rectifiers or diodes. A further object of this invention is to provide a method by which an integrally formed series of diodes or rectifiers may be mass produced with the individual diodes or rectifiers uniformly matched.

A further object of this invention is to provide an improved method of fabricating matched diodes or rectifiers with relatively high yields and greater efficiencies as individual units than heretofore possible. A further object of this invention is to provide a high voltage diode or rectifier assembly comprising a series of rectifying junctions in an integral semi-conductor body arranged normal to the planes of the major surfaces of the semiconductor body, with alternate junctions bypassed or shorted by conductive means to provide a circuit equivalent of a series arrangement of diodes or rectifiers. A further object of this invention is to provide an improved method of efficiently fabricating a high voltage diode or rectifier assembly in an integral semiconductor body having a circuit equivalent of a series of individual diodes or rectifiers in which the rectifying junctions of the individual diodes are simultaneously formed in a single diffusion step, and in a manner to properly match inverse breakdown voltages and leakage current of each rectifier or diode to the others in the assembly.

A further object and advantage of the present invention is to provide a means and method of making semiconductor devices with the stability and low leakage currents characteristics which are typical of planar passivated junctions made by standard techniques. A further object and advantage obtained by the present invention is to provide a means and method of fabricating semiconductor devices having junctions insensitive to moisture or variable surrounding ambients.

These and other objects and advantages of the present invention will be more clearly understood when considered in conjunction with the accompanying drawings, in which:

FIG. 1 is a perspective, somewhat schematic view, of a semiconductor body partially prepared for use in the present invention;

FIGS. 2 to 4 inclusive are somewhat schematic cross sectional enlargements of a semiconductive body after treatment by a sequence of steps in a preferred method of fabricating semi-conductive devices contemplated by this invention, with the cross sections taken along the line 2—2 of FIG. 1;

FIGS. 5 to 8 inclusive are somewhat schematic cross sectional illustrations of a semiconductive body after treatment by an alternate method to those illustrated in FIGS. 2 to 4;

FIGS. 9 to 11 inclusive are somewhat schematic cross sectional elevations of a semiconductive body after treatment by the methods of FIGS. 2 to 8 and after further sequential steps taken substantially along the line 9—9 of FIG. 12;

Figure 1:
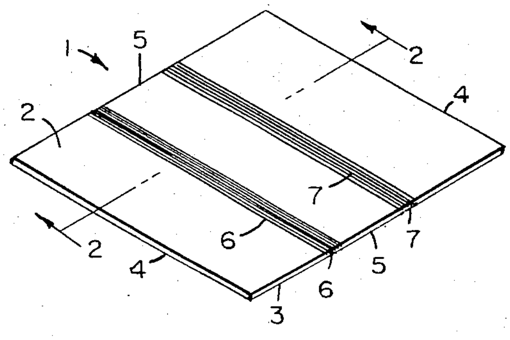

The present invention will be described primarily in connection with the fabrication of a high voltage diode or rectifier assembly utilizing a silicon semiconductor body. However, the principles described herein may be applied to the fabrication of other devices utilizing other semiconductive materials.

The silicon body 1 of semiconductive grade is used as a starting material for the invention. The body 1 has opposite major surfaces 2 and 3 which preferably lie in parallel planes. The other surfaces 4 and 5 respectively form the ends and sides of the body. The opposite surfaces 2 and 3 may be of any convenient dimensions dependent upon the manufacturing techniques utilized to form the body and the desired number and type of devices to be formed therefrom. Normally, the larger the body the greater will be the number of integrated assemblies that may be formed at one time. Thus while a major surface dimension of 1.1″ x 1.1″ is convenient for certain numbers and types of devices, it is not necessarily limiting. The thickness of the semiconductor body or wafer 1 may also vary depending upon the techniques utilized and the particular electrical characteristics desired in the devices or assemblies ultimately fabricated. For high power relatively low voltage devices thicknesses of between 20 and 30 mils are convenient and normal for starting the process. For high voltage low current devices thicknesses of 5 to 8 mils are convenient and normal. But again, these thicknesses may also depend upon the particular characteristics desired in the ultimate devices which are formed. The actual dimensions of the starting body 1 may therefore be calculated by known techniques from the desired parameters of the devices to be formed.

Figure 2:
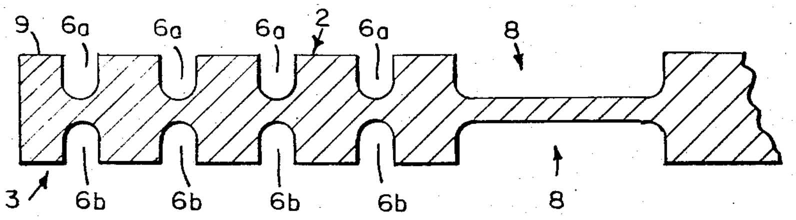
Figure 3:
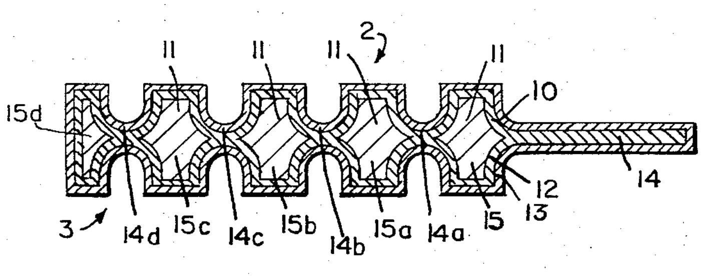
Figure 4:
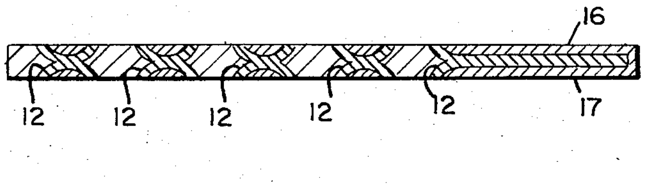

In a preferred method of fabricating a high voltage integral diode or rectifier assembly having very high voltage breakdown characteristics, initial steps of fabrication illustrated in FIGS. 2 to 4 inclusive may be used.

In this method the starting wafer or body 1 may, for example, have a thickness of 25 mils and major surface dimensions of 1.1″ x 1.1″. A plurality of grooves 6 and 7 are cut into opposite major surfaces 2 and 3 of the body 1 by well known cutting techniques. These grooves are aligned on opposite surfaces in pairs **6*a* and 6*b* and are arranged in at least one and preferably a plurality of separated series of pairs of grooves. The number of pairs of grooves cut in each series depends upon the number of junctions which are to be formed. For each pair of opposite grooves cut, two junctions will be formed. One pair of endmost grooves in each series, as illustrated at 8, is substantially wider than the other grooves in the series. The number of series depends upon the number of devices to be fabricated from the body. For the particular embodiment described utilizing a wafer of 25 mils thick, each groove is uniformly cut to a depth of between 7½ and 10 mils, and preferably to a depth of 10 mils. The space between grooves may vary, as for example between 13 and 18 mils but preferably each space is 15 mils. The widths of the grooves 6 and 7 may vary but preferably are uniformly 8 mils wide. The width of grooves 8 should be wide enough to provide a surface for alloying or soldering contacts in the ultimate assembly and for this purpose should have a width of between 10 and 100 mils. An uncut portion, as indicated at 9, at the side of each series of grooves opposite to the side at which grooves 8** are formed, should have a minimum surface length of between 10 and 100 mils for the purpose of providing contacts to the ultimate assembly.

The cuts or grooves and lapping described herein may be attained by conventional techniques. In the described embodiment 5 pairs of grooves are formed in each series by securing 5 aligned sets of blades to a cutting arbor above and below the body 1 with one pair of sets having a multiplicity of blades secured side by side to form the wider groove 8.

The silicon wafer or body 1 may be either P or N type material depending upon the particular devices which are to be made. Thus, while the following description shall for convenience assume that silicon body 1 is N-type material, it should be understood that the same technique may be used starting with P-type silicon material to obtain devices such as controlled rectifiers, power rectifiers or diodes of different characteristics.

N-P junctions are formed in the bulk silicon wafer of N-type material. These junctions are preferably formed in the N-type material by a conventional vapor diffusion technique with the diffusion of P-type impurity into the silicon wafer 1. As illustrated in FIG. 3 the P-type diffused layer 10 forms junctions 12 in the substrate 11 (or alternately if the starting material were P-type, an N-type diffused layer would be formed in a P-type substrate by diffusion of an N-type dopant). Any suitable dopant may be used in diffusing into the silicon body. Thus, for example, aluminum, gallium, boron and other P-type dopants may be used for P-type diffusion into the N-type silicon wafer. When the silicon wafer is P-type any suitable N-type dopant such as arsenic, antimony, phosphorous or others may be used. In doping N-type silicon wafers, aluminum and boron are preferred as P-type dopants, particularly in combination. The aluminum which diffuses faster, forms the junctions indicated at 12 while the slower diffusing boron diffuses into the silicon material to a depth indicated at 13. The boron is useful in providing an improved surface for low bulk or series resistance contacts to be formed on the ultimate device. The preferred diffusion into the silicon body 1 is conducted under known techniques, preferably within a temperature range of between 1000° to 1350° C. in order to assure controlled diffusion. The diffusion is conducted for a sufficient time so as to permit the formation of junctions 12 with the configuration as illustrated. As shown in FIG. 3, the P-type material is diffused entirely through the silicon body 1 at the grooves but the diffusion is controlled so that the internal portion of the silicon body below the uncut portions remains N-type. The diffused body thereby forms alternate longitudinally aligned P and N portions 14, 15, **14*a*, 15*a*, 14*b*, 15*b***, etc.

After the alternate P and N type portions have been formed, the diffused wafer or body is then mechanically lapped on both surfaces 2 and 3 to remove sufficient silicon so as to form a new upper and lower surface illustrated in FIG. 4 at 16 and 17 and to expose the internal N-type silicon portions. The amount of material removed from each surface 2 and 3 must be greater than the depth of diffusion so that each substantially vertical segment of the junctions 12 extend to the new surfaces 16 and 17 and thereby form junctions extending through the semiconductor body 1 from one major surface to the other to define distinct and alternate portions of contrasting type silicon material.

After lapping, the body 1 is preferably etched by known techniques for the purpose of removing any damage to the silicon crystal which may have occurred during the lapping process. If desired, each series of grooves 6 and 7 may be separated one from the other for further individual treatment at this stage. However, such separation need not take place at this stage and may be deferred as described herein.

Figure 9:
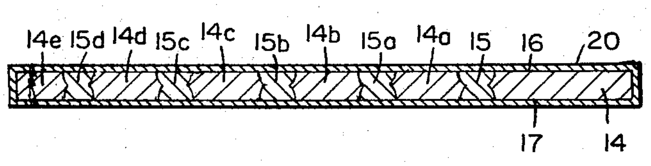

After lapping and polishing the body is then oxidized within an oxidizing atmosphere to form a silicon dioxide layer over the entire lapped surface 20 as illustrated in FIG. 9. This protecting layer 20, which in the embodiment disclosed is formed of silicon dioxide, preferably covers the entire body 1. The oxide layer may be formed by a conventional and simple technique with an oxygen, steam or other oxidizing atmosphere at elevated temperatures, within a range of 900° C. to 1200° C. for a sufficient length of time to form a protective mask, but the preferred method would be to use a silicon dioxide vapor plating technique. This step is illustrated in FIG. 9.

Figure 10:
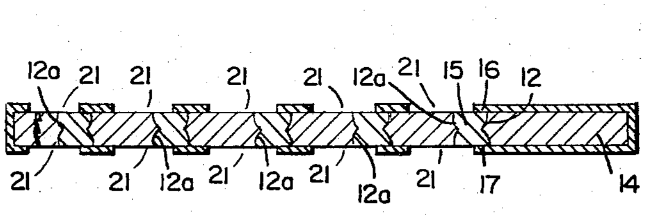

After the masking layer 20 has been deposited the layer 20 is covered with a photo resist material except along areas overlying alternate junctions **12*a*. Longitudinal transverse openings or holes 21 are then formed in the masking layer 20 by placing the body in a suitable and conventional etching bath for a sufficient period of time to remove the exposed portions of the masking layer 20 and to expose opposite sides of the alternate junctions 12*a*. As illustrated in FIG. 10, these holes 21 are arranged in pairs with one on either side 16 and 17 of the body 1 and with the holes exposing opposite edges of alternate junctions 12*a*** along their entire transverse length. The other junctions preferably remain masked.

The exposed junctions **12*a* are shorted or bypassed by depositing a conductive material over the edge of the junction by known techniques. A vapor deposition or an electroless plating technique may be used to deposit suitable conductors 22** such as aluminum, gold, silver, nickel, copper or other conductors.

Figure 12:
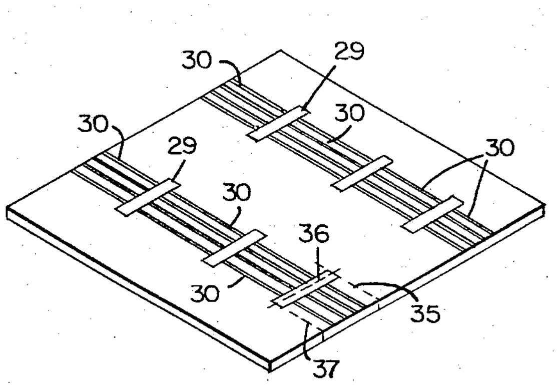
FIG. 12 is a perspective view of a semiconductive body partially processed in accordance with the present invention.

After the shorting members 22 have been deposited, the wafer 1 is treated so as to form a number of separate or distinct side by side partially formed assemblies. While these steps may be performed prior to the shorting of the alternate junctions, it is preferable that they be formed after deposition of the shorting members 22. In these steps, a photo resist material is deposited as a layer over the entire body except for areas on opposite major surfaces with the upper of each pair of areas indicated at 29 in FIG. 12. This photo resist layer is intended to protect the body, shorting element and the oxide mask layer from the etching process to follow. These opposite areas 29 in the photo resist layer each extend completely across the grooves 6 and 7. A plurality of these pairs of areas 29, arranged side by side and spaced one from the other, define a plurality of separate multi-junction segments 30. The assembly is then placed in a suitable etching bath for a sufficient period of time to form through holes aligned with the areas 29, with these holes extending all the way through the assembly from the upper surface to the lower surface. If desired, these holes 29 may be formed by other techniques, such as ultrasonic cutting, but it is believed that an etching technique is the simplest method of forming such holes. After these holes have been cut, the assembly may be subject to a further oxide masking treatment by known techniques such as described above to cover the exposed junctions at the sides of the holes. Following the oxide masking of the assembly, individual assemblies may be separated by cutting them from the body along lines such as indicated at 35, 36, 37.

Terminal connections may be made to the endmost portions 14 and **15*d* of each individual assembly by exposing openings 23 in the masking layer 20** at these portions. The endmost portions are relatively larger than the intermediate portions as described above, and therefore conventional techniques may be used for attachment of low ohmic connections to these portions, which connections may preferably also serve as heat sinks.

Figure 13:
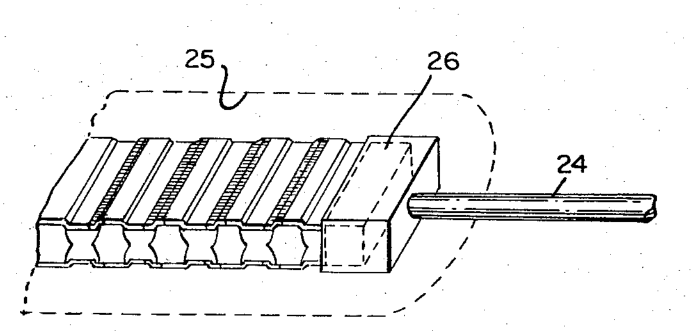
FIG. 13 is a perspective view of a device made in accordance with the present invention.

If desired, an oxide mask coating may be deposited over the entire assembly to further protect the junctions which have been formed. The assembly may be encapsulated in a high temperature resistance silica filled silicon polymer as illustrated at 25 in FIG. 13 in dotted outline. The low ohmic leads 24 connected to each end portion may be made of silver or other suitable conductors and may, if desired, extend from a heat sink 26 which has been deposited on the endmost portions.

The foregoing process describes a technique in which the silicon semiconductor body 1 is fabricated in part by a cutting technique. This cutting technique is useful when fabricating higher power and relatively low voltage devices wherein relatively thick silicon bodies may be used to obtain an overall layer junction area. Thus, for example, if a device were being fabricated to pass 10 amps at 10,000 volts, a device having a surface of approximately 1 square inch and a thickness of between 50 and 10 mils at the junctions, with a series of between 10 and 20 junctions may be used. But when a thinner device is desired, this technique is limited by the tolerances of the cutting wheel as well as the integral strength of the device being formed. Consequently an alternate technique must be used for fabricating thinner devices. This alternate technique, which is based on an oxide masking technique, is particularly useful in the fabrication of high voltage low current devices adapted, for example, to pass .5 amps over 10,000 volts. Such a device may, for example, have up to a hundred or more junctions arranged in series with the assembly having a surface of 1" square and a thickness of between 3 and 4 mils. In this method the diffusion depths are limited to approximately 2 or 3 mils which consequently limits the overall thickness of the device that may be made in accordance with this alternative technique.

Figure 5:
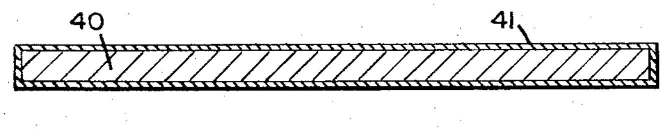
Figure 6:
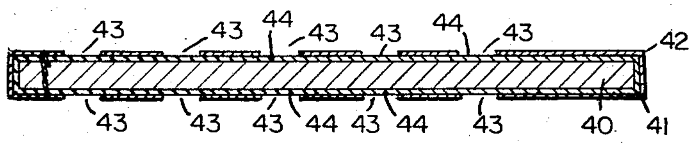

In this alternate technique, a silicon semiconductor body 40, of the type described previously, as illustrated in FIG. 5, but with a thickness of for example between 5 and 8 mils, is entirely covered with an oxide mask by known techniques such as described above. This oxide mask 41 may, for example, have a thickness of up to 10,000 angstroms depending upon known design requirements. The oxide coating 41 may be deposited by any one of several methods such as thermal or vapor plating techniques.

After the silicon body 40 has been oxide masked, a photo resist coating 42 is applied. This photo resist coating is applied over substantially the entire body, except for a series of pairs of aligned longitudinal areas 43, on opposite sides of the body 40. The length of each of these areas 43 is preferably the entire width of the body 40. The width of these openings 43 may vary but preferably each should be approximately 8 mils, except for the endmost at one end of each series which should be substantially wider with a width of between 10 and 100 mils to provide area sufficient for subsequent attachment of a low ohmic contact. The openings 43 may be spaced apart at varying distances dependent upon the particular device being fabricated, but preferably in the example described are spaced apart 15 mils with a variation of 13 to 17 being satisfactory. Any number of openings 43 may be formed depending upon the number of junctions in series desired. In the embodiment described 5 pairs of such openings 43 are provided. The shape between each adjacent series of openings 43 should be sufficient to permit detachment of each series from the adjacent one and for the attachment of low ohmic connections.

Figure 7:
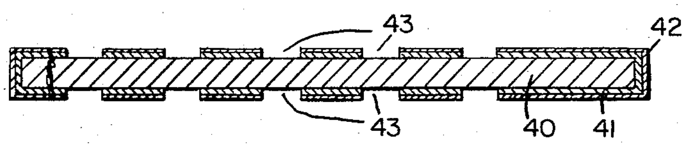

After the photo resist layer 42 having openings 43 has been applied to the oxide mask layer, the assembly is etched in a suitable etch material by known techniques so as to remove the exposed portion of the silicon oxide mask to open holes exposing the major surfaces 44 and 46 of the silicon body beneath the openings 43, as illustrated in FIG. 7.

Figure 8:
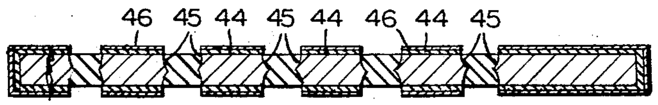

After openings have been formed in the oxide mask layer, the material is then suitably diffused to form rectifying junctions 45 which extend transversely through the silicon body in planes substantially normal to the major surfaces 44 and 46 of the silicon body. The diffusion techniques may be similar to those previously described except the diffusion will take place for a shorter period of time since a thinner body is used and consequently diffusion to a shorter depth is required. The diffusion, however, should be for sufficient length of time as to form the rectifying junctions completely across the silicon wafer as illustrated in FIG. 8. In the embodiment illustrated, a silicon body of N-type material may be doped with a P-type dopant or dopants such as boron or aluminum to form the rectifying junctions 45.

After formation of the rectifying junctions 45, the oxide mask 41 and the photo resist layer 42 may be removed by washing in a solvent and a suitable etching technique using, for example, a bath containing hydrofluoric acid.

A new oxide mask formed of silicon dioxide or other suitable material is then deposited to cover opposite edges of alternate rectifying junctions **12*a*** while exposing the intermediate junctions whereby the partially completed assembly will have the same configuration as previously described at the stage illustrated in FIG. 10. From this point on, further treatment may follow the steps described in connection with the previously described embodiment.

Figure 14:
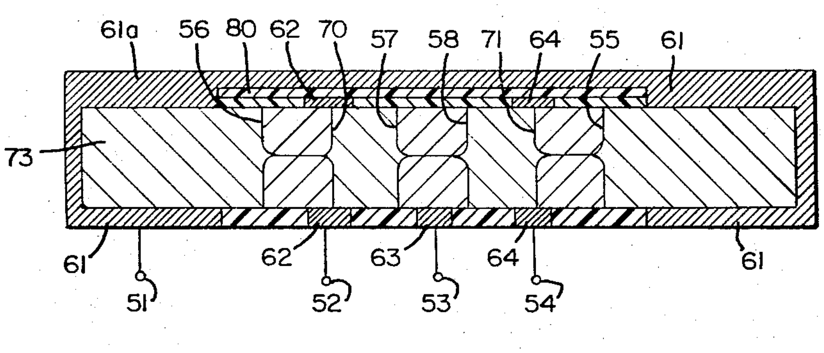
FIG. 14 is a schematic cross section of an integrated circuit in the form of a high power high voltage diode assembly.
Figure 15:
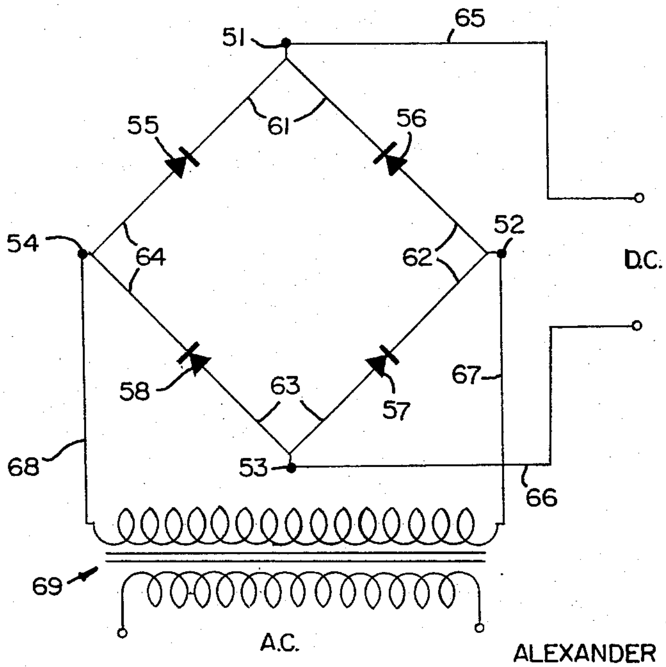
FIG. 15 is a circuit schematic of the device illustrated in FIG. 14.

In FIGS. 14 and 15 there is illustrated an integrated circuit that may be formed by the techniques previously described. While these figures illustrate a high power, high voltage bridge type full wave rectifier circuit, the techniques described may be used to fabricate other type circuits.

Rectifier circuits such as illustrated in FIGS. 14 and 15 and made in accordance with the described invention have better power conversion efficiency than can be obtained from other rectifier circuits. In addition, with a full wave circuit smaller filtering elements may be used. Such devices also require less space and provide better reliability with possible savings in costs.

The circuit, as illustrated in FIG. 15, has four diodes 55, 56, 57 and 58 which are poled to connect in series or pairs. Thus, series pairs 56 and 57 are connected between terminals 53 and 51 with intermediate terminal 52. The pair of diodes 55 and 58 are also series connected between terminals 53 and 51 with intermediate terminal 54. The pairs 55 and 56 and 57 and 58 are connected in opposition. Terminals 51 and 53 are connected through leads 65 and 66 respectively to a DC power source while terminals 52 and 54 are connected through leads 67 and 68 to an AC power source 69.

This circuit arrangement finds its structural equivalent in the integrated device schematically shown in FIG. 14 where like numerals refer to like components. In addition to the four rectifying junctions shown in FIG. 15, FIG. 14 contains two additional rectifying junctions 70 and 71 which are formed and bypassed in the fabrication of this circuit.

Figure 11:
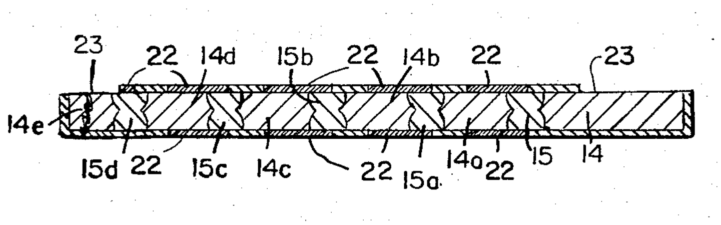

The circuit illustrated in FIG. 14 may be fabricated using the techniques described above. The semiconductor body 73 may be, for example, an N-type silicon body overdoped with a P-type impurity to form alternate portions of contrasting type conductivity defined by the rectifying junctions 56, 70, 57, 58, 71 and 55 in series and extending from the upper to the lower surface of the body 73, in a manner as previously described. In this arrangement and in the process, however, seven alternate portions with six junctions are formed. The rectifying junctions 70 and 71 are shorted by conductive metal deposits 62 and 64 in a manner also as described above. However, at the same time these conductive bypasses 62 and 64 are being formed, additional metal deposits may be made by the same techniques. These deposits form the conductors 63 and 61. Such deposits may be made in a manner similar to that described and illustrated in FIG. 11.

In order to complete the integrated circuit construction described and partially fabricated, it is necessary to connect the endmost conductive segments 61, as illustrated in FIG. 14, without shorting the intermediate elements. This may be accomplished by depositing a nonconductive masking layer over the metal members or bypass connectors 62 and 64 after they have been deposited by suitable techniques. The masking layer thus deposited is illustrated at 80 and preferably should not cover the deposit of metal segments 61 at opposite ends of the assembly. This may be accomplished by suitable techniques as previously described. After the masking layer or protecting layer 80 has been deposited, a metal bridge *61a* is deposited by suitable techniques over layer 80 and connecting the opposite segments 61 to form a continuous electrical circuit between them. The conductive metal layer *61a* may be deposited in selected areas by suitable techniques which may, for example, comprise deposition of an oxide mask or protective layer over the areas in which it is not desired to deposit the metal layer *61a*.

The device as described may then be completed by the attachment of leads 51 to 54 respectively to the metal connecting members 61, 62, 63 and 64 by known techniques. The device may then be encapsulated if desired.

What is claimed is:

1. A method of fabricating an integral semiconductor device having a series of rectifying junctions comprising, forming a semiconductive body of one type of conductivity with a first series of transverse spaced grooves on a major surface thereof and a second series of grooves aligned with said first series on a surface opposite said major surface, diffusing into said body from said major and opposite surfaces thereof a dopant of an opposite type conductivity into limited portions of said body to form alternate first and second contrasting conductivity type segments defined by a series of rectifying junctions intermediate said segments and extending from said major surface thereof to said opposite surface with at least portions of said junctions lying in planes angular to said major surface with said dopant being diffused entirely through said body in areas beneath said grooves and only partially through said body in areas intermediate said grooves, removing a layer of said body from said major surface to expose angular portions of said junctions, depositing conductive means across at least one junction on said surface to bypass said one junction and to connect a first type conductivity portion which in part forms another junction on one side of said one junction to a second type conductivity portion on the other side of said one junction which second type conductivity portion in part forms a further junction on the other side of said one junction, and connecting leads to portions on opposite sides of said one junction.

2. A method as set forth in claim 1 wherein said angular portions of said junctions are exposed by removing layers from both of said surfaces.

3. A method of fabricating an integral semiconductor device having a series of rectifying junctions comprising, forming a semiconductive body having first and second opposed surfaces, with a first type of conductivity, diffusing at least one dopant into said body from said first and second surfaces to form alternate first and second contrasting conductivity type segments defined by a series of rectifying junctions intermediate said segments and extending from one surface thereof to the other, and depositing conductive means across at least one junction, wherein a first series of longitudinally extending grooves are formed on said surface and a second series of grooves aligned with said first series are formed on said second surface prior to said diffusing step.

4. A method in accordance with the method of claim 3 wherein said junctions are exposed by removing layers from said first and second surfaces.

5. A method in accordance with the method of claim 3 wherein said dopant is a mixture of aluminum and boron.

References Cited

UNITED STATES PATENTS

| | | | |
|---|---|---|---|
| 2,875,505 | 3/1959 | Pfann | 29—578 |
| 2,944,321 | 7/1960 | Westberg | 29—578 |
| 2,967,344 | 1/1961 | Mueller | 29—578 |
| 3,025,438 | 3/1962 | Wegener | 148—187 X |
| 3,029,366 | 4/1962 | Lehovec | 317—101 |
| 3,054,034 | 9/1962 | Nelson | 317—235 |
| 3,117,260 | 1/1964 | Noyce | 317—235 |
| 3,158,788 | 11/1964 | Last | 317—101 |

WILLIAM I. BROOKS, *Primary Examiner.*